March 30, 1926.                    N. W. CUMMINS                    1,578,808
                                     COUPLING
                                 Filed June 1, 1920
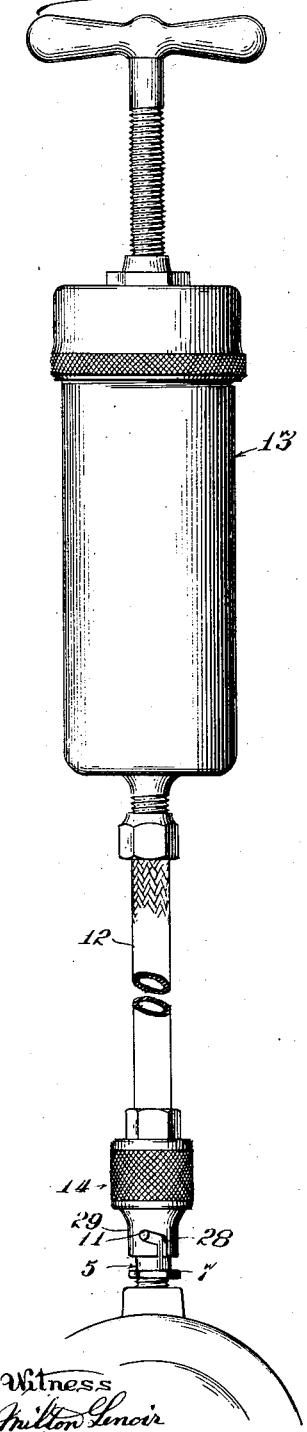
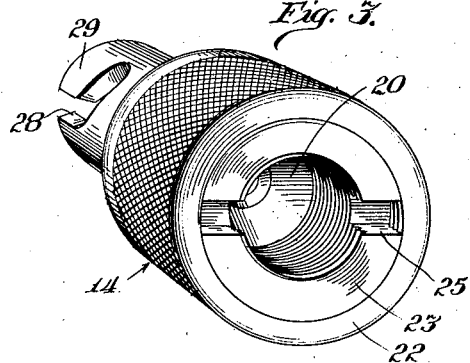
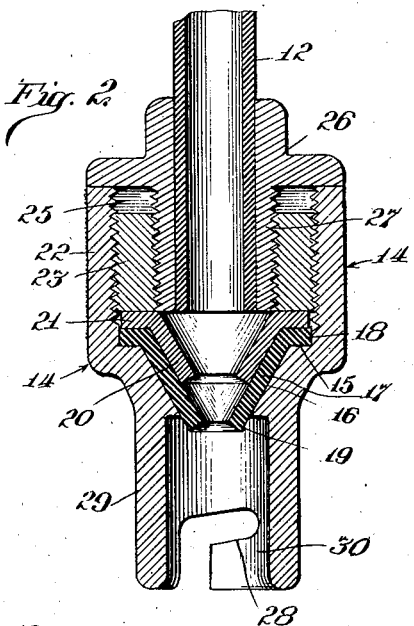
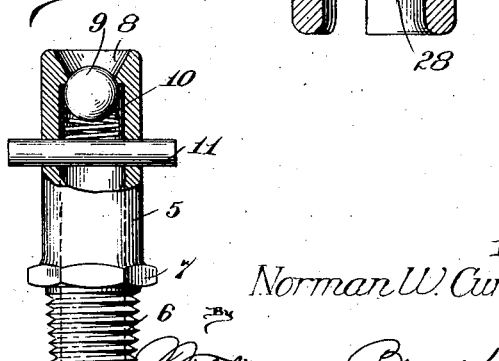
Inventor
Norman W. Cummins Patented Mar. 30, 1926.

1,578,808

UNITED STATES PATENT OFFICE.

NORMAN W. CUMMINS, OF BRIDGEPORT, CONNECTICUT, ASSIGNOR TO THE BASSICK MANUFACTURING COMPANY, OF CHICAGO, ILLINOIS, A CORPORATION OF DELAWARE.

COUPLING.

Application filed June 1, 1920. Serial No. 385,529.

*To all whom it may concern:*

Be it known that I, NORMAN W. CUMMINS, a citizen of the United States, residing at Bridgeport, in the county of Fairfield and State of Connecticut, have invented a certain new and useful Improvement in Couplings, of which the following is a full, clear, concise, and exact description, reference being had to the accompanying drawings, forming a part of this specification.

My invention relates to improvements in couplings, and is especially concerned with the provision of a novel coupling for use in connection with lubricating devices similar to that illustrated and described in the patent of Arthur V. Gullborg, No. 1,307,734 of June 24, 1919. This patent discloses a lubricating means comprising a plurality of hollow coupling members adapted to be secured to bearings to be lubricated, a lubricating pump or compressor having a discharge conduit, the free end of which is provided with a coupling member adapted to co-act with the coupling members secured to the bearings and comprising means for sealing the joint between the bearing coupling members and the compressor coupling member.

The objects of my invention are:

First: To provide co-acting coupling members for lubricating means of the type disclosed in the Gullborg patent, which are simple in construction, economical to manufacture and which will provide an effective seal between the two coupling members;

Second: To provide a novel type of coupling member adapted to be secured to a bearing;

Third: To provide a novel type of coupling member adapted to be secured to the discharge conduit of a lubricant compressor, and;

Fourth: To provide two co-acting coupling members with means for sealing the joint between the two coupling members, so constructed as to compensate for slight variations in the dimensions of the two coupling members, so as to maintain a tight joint between the two coupling members.

Other objects will definitely appear as this description progresses, reference being had to the accompanying drawings, in which, Figure 1 is a side elevation of my improved coupling showing it in use for connecting a lubricant compressor with a bearing;

Figure 2 is a central longitudinal section through my improved coupling member, adapted to be secured to the end of a lubricant compressor;

Figure 3 is a perspective view of the coupling member illustrated in Figure 2 with the end cap removed; and Figure 4 is a side elevation partially in section of my improved coupling member which is adapted to be secured to a bearing.

Referring to the drawings, I shall first describe my improved coupling member which is adapted to be secured to bearings to be lubricated. This coupling member comprises a hollow tubular-shaped member 5 provided at one end with screw-threads 6 by means of which it can be secured to any desired bearing. Adjacent the screw-threaded portion 6, I provide a plurality of facets 7 adapted to receive the jaws of a wrench or other similar tool, whereby the coupling member can be secured to a bearing. The opposite end of this coupling member is provided with a conical inwardly tapering seat 8 against the inner face of which the closure 9 is forced by means of a spring 10, one end of which engages the closure and the other end of which rests upon a pin 11, extending across the tubular member and through both walls thereof.

The coupling member which is secured to the flexible discharge conduit 12 of the compressor 13 comprises a tubular member 14, the bore of which is constricted to form a shoulder 15 having an outwardly tapering conical seat 16 on which is seated a hollow conical shaped expansible sealing member 15, which may be formed of leather, rubber or other suitable material and which is provided at its larger end with a flange 18 seating upon the shoulder 15. The end 19 of the sealing member projects beyond the end of the tapered bore in which it is seated for a purpose to be described later on.

I provide a conical-shaped follower 20 for holding the sealing member 17 upon its seat, the follower having a flange 21 at its wider end adapted to rest against the flange 18 of the sealing member.

The enlarged portion 22 of the coupling member is provided with screw threads on its inner periphery for co-acting with the externally and internally screw-threaded nut 23 by means of which the follower 20 can be tightly clamped against the sealing member 17. The outer end of the nut 23 is provided with oppositely disposed slots 25 for receiving the lugs of a spanner wrench.

Soldered or otherwise secured to the free end of the flexible discharge conduit 12 is an end cap 26 provided with a screw-threaded extension 27 adapted to co-act with the internal screw threads of the nut 23 to secure the flexible discharge conduit to the coupling member.

The reduced end 29 of the coupling member 14 is provided with a bayonet slot 28 adapted to co-act with the pin 11 of the coupling member 5 to detachably lock these coupling members together, the bore 30 in the reduced end 29 being just sufficiently large to receive the tubular member 5.

When the two coupling members are locked together, the smaller end of the sealing member 17 will rest against the conical seat 8 of the coupling member 5. When the plunger or piston of compressor 13 is actuated to expel lubricant therefrom, the pressure of the lubricant will force the end of the sealing member 17 into tight contact with the conical seat 8 of the tubular member 5, thereby sealing the joint between the two coupling members. The greater the pressure of the lubricant, the tighter will be the sealing effect of the sealing member 17. By making the sealing member 17 of material such as leather or rubber which will stretch slightly under pressure the sealing member can expand sufficiently to compensate for any slight differences in machining of the two coupling members, which would otherwise cause an imperfect connection between the two coupling members.

I have described the details of the preferred embodiment of my invention, but it is to be clearly understood that my invention is not limited to these details, but is capable of other adaptations and modifications within the scope of the appended claims.

Having thus described my invention, what I claim is:

1. The combination with a coupling member comprising a hollow cylindrical member one end of which is provided with a conical inwardly tapering seat and a closure for sealing against the inner side of said seat, of a second coupling member comprising a conduit for conducting lubricant, a hollow expansible conical-shaped sealing member for co-acting with said conical seat to seal the joint between said coupling members, and co-acting means on said coupling members for connecting said coupling members in detachable relation.

2. The combination with a coupling member comprising a hollow cylindrical member one end of which is provided with a conical inwardly tapering seat and a closure for sealing against the inner side of said seat, of a second coupling member comprising a conduit for conducting lubricant, and a hollow conical-shaped sealing member for co-acting with said conical seat to seal the joint between said coupling members.

3. A coupling member comprising a tubular member having a constricted bore forming a shoulder, the narrower portion of said bore being tapered toward one end and the broader portion of said bore being screw-threaded, a hollow conical-shaped sealing member seated in said tapered portion of the bore, and having its smaller end extending beyond the end of the tapered portion of said bore, a hollow conical-shaped follower resting against said sealing member but of less length than said sealing member, and a screw-threaded member coacting with the screw-threaded portion of said bore and said follower to clamp the wider portion of said sealing member against said shoulder.

4. A coupling member comprising a tubular member having a constricted bore forming a shoulder, the narrower portion of said bore being tapered toward one end, a hollow conical-shaped sealing member seated in said tapered portion of the bore and having its smaller end extending beyond the end of the tapered portion of said bore, a hollow conical shaped follower resting against said sealing member but of less length than said sealing member, and a member coacting with the said follower to clamp the wider portion of said sealing member against said shoulder.

5. A coupling member comprising a tubular member having a constricted bore forming a shoulder, the narower portion of said bore being tapered toward one end, a hollow conical-shaped sealing member seated in said tapered portion of the bore and having its smaller end extending beyond the end of the tapered portion of said bore, a hollow conical-shaped follower resting against said sealing member, and a member co-acting with the said follower to clamp the wider portion of said sealing member against said shoulder.

6. The combination with a coupling member comprising a hollow cylindrical member, one end of which is provided with a conical inwardly tapering seat and a closure for sealing against the inner side of said seat, of a second coupling member comprising a conduit for conducting lubricant, and a hollow sealing member for co-acting with said conical seat to seal the joint between said coupling members.

In witness whereof, I hereunto subscribe my name this 30th day of April, 1920.

NORMAN W. CUMMINS.